United States Patent
Yu

(10) Patent No.: US 10,170,208 B2
(45) Date of Patent: Jan. 1, 2019

(54) ELECTROMAGNETIC COIL BOBBIN USED IN REACTOR AS WELL AS INNER BOBBIN AND OUTTER SHELL

(71) Applicant: Jie Yu, Shanghai (CN)

(72) Inventor: Jie Yu, Shanghai (CN)

(*) Notice: Subject to any disclaimer, the term of this patent is extended or adjusted under 35 U.S.C. 154(b) by 286 days.

(21) Appl. No.: 15/141,116

(22) Filed: Apr. 28, 2016

(65) Prior Publication Data

US 2017/0194063 A1 Jul. 6, 2017

(30) Foreign Application Priority Data

Dec. 31, 2015 (CN) .......................... 2015 1 10137819

(51) Int. Cl.
| | | |
|---|---|---|
| *H01F 1/00* | (2006.01) | |
| *G21C 7/12* | (2006.01) | |
| *H01F 5/02* | (2006.01) | |
| *H01F 5/06* | (2006.01) | |
| *H01F 7/06* | (2006.01) | |

(52) U.S. Cl.
CPC .................. *G21C 7/12* (2013.01); *H01F 5/02* (2013.01); *H01F 5/06* (2013.01); *G21Y 2002/10* (2013.01); *G21Y 2004/30* (2013.01); *H01F 7/06* (2013.01); *Y02E 30/39* (2013.01)

(58) Field of Classification Search
CPC .................. H01F 5/02; H01F 5/06; G21C 7/12
USPC .......................................................... 335/296
See application file for complete search history.

(56) References Cited

U.S. PATENT DOCUMENTS

| | | | | | |
|---|---|---|---|---|---|
| 2,896,045 | A | * | 7/1959 | Brunicardi | ............. H01H 50/54 200/295 |
| 5,508,671 | A | * | 4/1996 | Takashi | ................. F16D 27/112 335/296 |
| 2001/0017583 | A1 | * | 8/2001 | Matsumoto | ............... H01F 5/04 336/208 |

FOREIGN PATENT DOCUMENTS

| | | | | | |
|---|---|---|---|---|---|
| CA | | 2896045 | A1 * | 3/2016 | ............... B32B 5/12 |
| CN | | 2442364 | Y | 8/2001 | |
| CN | | 203026286 | U | 6/2013 | |
| CN | | 103871709 | A | 6/2014 | |
| CN | | 104200949 | A | 12/2014 | |
| CN | | 105047401 | A | 11/2015 | |
| CN | | 205028738 | U | 2/2016 | |

\* cited by examiner

*Primary Examiner* — Shawki S Ismail
*Assistant Examiner* — Lisa Homza
(74) *Attorney, Agent, or Firm* — Oliff PLC

(57) ABSTRACT

The invention discloses an electromagnetic coil bobbin used in reactor as well as an inner bobbin and an outer shell thereon, wherein more than one cut-off grooves are provided on the inner bobbin and the outer shell and uniformly distributed on corresponding inner bobbin or outer shell such that the inner bobbin and the outer shell of which the material of the main body is metal have excellent high-temperature resistance and avoid generation of induced eddy current, and such that the electromagnetic coil can generate a more uniform magnetic field while operating, thus achieving technical effects of reducing or avoiding eccentric wear, reducing or avoiding partial excessive wear, etc., and realizing the objectives of improving and raising movement performance of CRDM.

14 Claims, 3 Drawing Sheets

US 10,170,208 B2

ELECTROMAGNETIC COIL BOBBIN USED IN REACTOR AS WELL AS INNER BOBBIN AND OUTTER SHELL

TECHNICAL FIELD

The invention relates to the field of parts and equipment of control rod drive mechanism of a reactor, particularly to an electromagnetic coil bobbin used in reactor as well as an inner bobbin and an outer shell thereon.

BACKGROUND

Reactor is the core part of a nuclear power station, while the reactor control rod drive mechanism (CRDM) can lift, insert or keep the position of the control rod in the reactor core, and is used to control fission rate of the reactor, and realize starting and stopping the reactor and adjustment of reactor power; under accident conditions CRDM can also rapidly insert the control rod (rapidly dropping the rod), such that the reactor is urgently stopped in a short time to ensure safety. These functions can not be realized without CRDM electromagnetic coil assembly, due to its special operating environment and essential functions, it requires that the CRDM electromagnetic coil must have characteristics of high temperature resistance grade, excellent insulating property, radiation resistance, humidity resistance, shock resistance and the like.

For a long time, the temperature resistance grade of the CRDM electromagnetic coil assembly of the nuclear power station can only reach around 250° C. at most, while the temperature of the coolant in the reactor is above 300° C., so in practical applications the electromagnetic coil assembly can be cooled only through forced ventilation to ensure reliable operation of CRDM, which complexities the upper structure of the head cover of the reactor.

In the prior art, in order to make the CRDM electromagnetic coil assembly of the nuclear power station have better high-temperature resistance, those skilled in the art make many efforts, e.g. the technical scheme provided by invention patent application with Application No. CN201410500311.4 and titled "electromagnetic coil insulating structure as well as electromagnetic coil outer shell and outer shell inner bobbin" can improve high-temperature resistance of the CRDM electromagnetic coil assembly of the nuclear power station, but there are also other disadvantages. Performing further study with respect to high-temperature resistant CRDM electromagnetic coil assembly to optimize operating characteristic of CRDM and adapt to new requirements of CRDM with extra-long life, is the important direction of improvement of the existing reactor control rod drive mechanism.

SUMMARY OF THE INVENTION

Aiming at performing further study with respect to high-temperature resistant CRDM electromagnetic coil assembly to optimize operating characteristic of CRDM and adapt to new requirements of CRDM with extra-long life as described above, the invention provides an electromagnetic coil bobbin used in reactor as well as an inner bobbin and an outer shell thereon. Aiming at the problems as described above, an electromagnetic coil bobbin used in reactor as well as an inner bobbin and an outer shell thereon provided by the invention achieve the objectives through the following technical points: an electromagnetic coil bobbin used in reactor, comprising an inner bobbin and an outer shell which form a cylindrical structure, wherein an annular cavity for containing a coil winding is formed between said outer shell and said inner bobbin, and the inner bobbin is located in an inner hole of the outer shell;

said inner bobbin and said outer shell each comprise a main body of which the material is metal and cut-off grooves provided on the main body, the cut-off grooves on the inner bobbin run through inner and outer walls as well as front and rear end faces of the inner bobbin, and the cut-off grooves on the outer shell run through inner and outer walls as well as front and rear end faces of the outer shell, there are at least two cut-off grooves on both the inner bobbin and the outer shell, the cut-off grooves on the inner bobbin are uniformly distributed on the inner bobbin, the cut-off grooves on the outer shell are uniformly distributed on the outer shell, and said cut-off grooves are each provided with an insulating connection strip therein.

In this scheme, the inner bobbin and the outer shell are such that the metallic main body and the cut-off grooves provided on the main body constitute the cylindrical structure of the inner bobbin and the outer shell, a gap between the inner bobbin and the outer shell is used to install the coil winding, and when the coil winding operates, the cut-off grooves on the inner bobbin and the outer shell are used to cut off the inner bobbin and the outer shell on the inner bobbin and the outer shell, i.e. the cut-off grooves are grooves provided on the inner bobbin or outer shell and used to truncate the inner bobbin or outer shell, so as to avoid generation of induced eddy current. Namely the technical scheme in which the cut-off grooves on the inner bobbin and the outer shell run through inner and outer walls as well as front and rear end faces of the inner bobbin or the outer shell, and there are at least two cut-off grooves on both the inner bobbin and the outer shell aims to realize that: if there are a plurality of cut-off grooves on the inner bobbin and the outer shell respectively, the main bodies of the inner bobbin and the outer shell are cut into the plurality of arc-shaped metal plates, and the arc-shaped metal plates are connected through the insulating connection strips such that the inner bobbin and the outer shell are a cylindrical structure as a whole, and in this way the structures of above inner bobbin and outer shell can facilitate respective shape preservation without forming induced eddy current loop.

The electromagnetic coil in CRDM of the existing nuclear power station has a bobbin which is an enclosed annular ring injection-compression molded with high molecular non-metallic material. But due to poor high temperature resistance of the high molecular material, generally the temperature resistance grade of the whole coil can only reach around 250° C. In order to overcome this weakness, there has been a high temperature coil employing metal bobbin, which can improve high temperature resistance, but its method in which only one cut-off groove is provided has some negative effects on operating characteristic of CRDM; the magnetic field produced by the coil made by winding on such bobbin has certain asymmetry, resulting in that the magnetic field easily produces asymmetric electromagnetic component forces, such that internal moving parts of the CRDM tend to rotate in the radial direction while moving in the axial direction, which increasing resistance force toward an anti-rotation stopper, and after movement for a long time, eccentric wear, partial excessive wear and other phenomena easily appear, thus making movement performance of CRDM become worse.

In this scheme, employing the technical scheme in which there are at least two cut-off grooves on both the inner bobbin and the outer shell, and the cut-off grooves on both the inner bobbin and the outer shell are uniformly distributed on the inner bobbin or the outer shell can make the magnetic field produced when the electromagnetic coil operates become completely uniform after going through the inner bobbin or the outer shell, and achieve the objectives of weakening or eliminating rotation trend produced when the internal moving parts of the CRDM moves in the axial direction, thus achieving technical effects of reducing or avoiding eccentric wear, reducing or avoiding partial excessive wear, etc., and realizing the objectives of improving movement performance of CRDM.

A further technical scheme is as follows:

Because the inner bobbin is used as a fixed substrate of the electromagnetic coil winding, both its installation and use only require an integral structure in a cylindrical shape, and as a specific technical scheme of the inner bobbin convenient to manufacture the inner bobbin, the insulating connection strips on said inner bobbin are insulating strips potted or embedded in the cut-off grooves on the inner bobbin.

Because the outer shell is used as a protective component of the electromagnetic coil winding, it should be equipped outside the electromagnetic coil winding after installing the coil winding, and as a technical scheme of the outer shell convenient to install the outer shell, a clamping slot or clamping projection is provided on the portions of the outer shell on both sides of each cut-off groove on said outer shell, the length direction of said clamping slot or clamping projection is parallel to the axial direction of the outer shell, the clamping slot or clamping projection is originated from one end of the outer shell, and the insulating connection strips on said outer shell are insulating clamping strips connected to the clamping slot or clamping projection on the portions of the outer shell on both sides of the same cut-off groove on the outer shell. In the above structure, through restriction of the insulating clamping strips toward corresponding clamping slot or clamping projection, combination of various parts of the outer shell is completed, while after removing above restriction, various parts of the outer shell are separated from each other.

In order to completely eliminate asymmetric electromagnetic component forces produced in the radial direction when the coil winding operates, the number of the cut-off grooves on said inner bobbin and the number of the cut-off grooves on the outer shell are in a multiple relationship, and the value of said multiple is a positive integer. By limiting the numbers of the cut-off grooves on the inner bobbin and the outer shell above, asymmetric electromagnetic component forces cancel each other out in respective radial directions of the electromagnetic coil winding, which can completely eliminate occurrence of the conditions such as eccentric wear, partial excessive wear and stress produced on the anti-rotation stopper due to asymmetric magnetic field produced by the electromagnetic coil.

As the technical scheme in which the electromagnetic coil produces completely uniform magnetic field, the number of the cut-off grooves on said inner bobbin is equal to the number of the cut-off grooves on the outer shell, positions of the cut-off grooves on the inner bobbin and the outer shell have one-to-one correspondence, and said one-to-one correspondence is that the cut-off grooves on the inner bobbin and the cut-off grooves on the outer shell are located in the same radial direction of the electromagnetic coil bobbin structure.

As the specific connection form between the inner bobbin and the outer shell, both ends of said inner bobbin are provided with annular outer edges, the axis of said outer edges and the axis of the main body are collinear, and the inner hole of the outer edge is connected to the end of the inner bobbin; the cut-off grooves on the inner bobbin extend to the end of the outer edge, the external diameter of said outer shell is not greater than the external diameter of the outer edge, the outer shell is clamped between two outer edges, and an insulating layer is provided between each outer edge and the end of corresponding outer shell. In above connection form, relative positions of the inner bobbin and the outer shell can be easily fixed, which is beneficial for the electromagnetic coil to keep excellent operating performance for a long time.

In order to protect the electromagnetic coil winding as much as possible, said annular cavity is an enclosed structure.

In order to facilitate processing and manufacturing, the length direction of the cut-off grooves on said inner bobbin and outer shell is parallel to the axial direction of the inner bobbin or the outer shell. The above structure can employ a metal cylinder with different internal diameters as the blank of the inner bobbin and the outer shell, and is evenly divided into several equal parts through accurate cutting in the axial direction and filled with the insulating connection strips in the portion worn off during cutting to obtain the inner bobbin and the outer shell required in this scheme.

The invention also provides an inner bobbin of the electromagnetic coil bobbin, wherein, said inner bobbin comprises a main body of which the material is metal and cut-off grooves provided on the main body, the length direction of said cut-off grooves is parallel to the axial direction of the inner bobbin, the cut-off grooves on the inner bobbin run through inner and outer walls as well as front and rear end faces of the inner bobbin, and there are at least two cut-off grooves on the inner bobbin, the cut-off grooves on the inner bobbin are uniformly distributed on the inner bobbin, and said cut-off grooves are each provided with an insulating connection strip therein. The invention also provides an outer shell of the electromagnetic coil bobbin, wherein, said outer shell comprises a main body of which the material is metal and cut-off grooves provided on the main body, the length direction of said cut-off grooves is parallel to the axial direction of the outer shell, the cut-off grooves on the outer shell run through inner and outer walls as well as front and rear end faces of the outer shell, and there are at least two cut-off grooves on the outer shell, the cut-off grooves on the outer shell are uniformly distributed on the outer shell, and said cut-off grooves are each provided with an insulating connection strip therein.

The technical scheme of the inner bobbin and the outer shell provided above can make the magnetic field through the inner bobbin or the outer shell completely symmetric relative to the axis of the electromagnetic coil when the coil winding operates, avoid eccentric wear and partial excessive wear between internal moving parts of the CRDM, achieve the objectives of protecting internal moving parts of the CRDM, and meanwhile is beneficial to improve movement performance of CRDM.

The invention has the following beneficial effects:

The structure of the electromagnetic coil bobbin provided by the invention employs the technical scheme in which there are at least two cut-off grooves on both the inner bobbin and the outer shell, and the cut-off grooves on the inner bobbin and the outer shell are uniformly distributed on the outer shell or the outer shell, which can make the magnetic field produced when the electromagnetic coil operates become completely uniform after going through the inner bobbin or the outer shell, and achieve the objectives of weakening or eliminating rotation trend produced when the internal moving parts of the CRDM moves in the axial direction, thus achieving the technical effects of reducing or avoiding eccentric wear, reducing or avoiding partial excessive wear, etc., and realizing the objectives of improving movement performance of CRDM.

The technical scheme of the inner bobbin and the outer shell provided by the invention can make the magnetic field through the inner bobbin or the outer shell completely symmetric relative to the axis of the electromagnetic coil when the coil winding operates, avoid eccentric wear and partial excessive wear between internal moving parts of the CRDM, and achieve the objectives of protecting internal moving parts of the CRDM, and meanwhile is beneficial to improve movement performance of CRDM.

Figure 1:
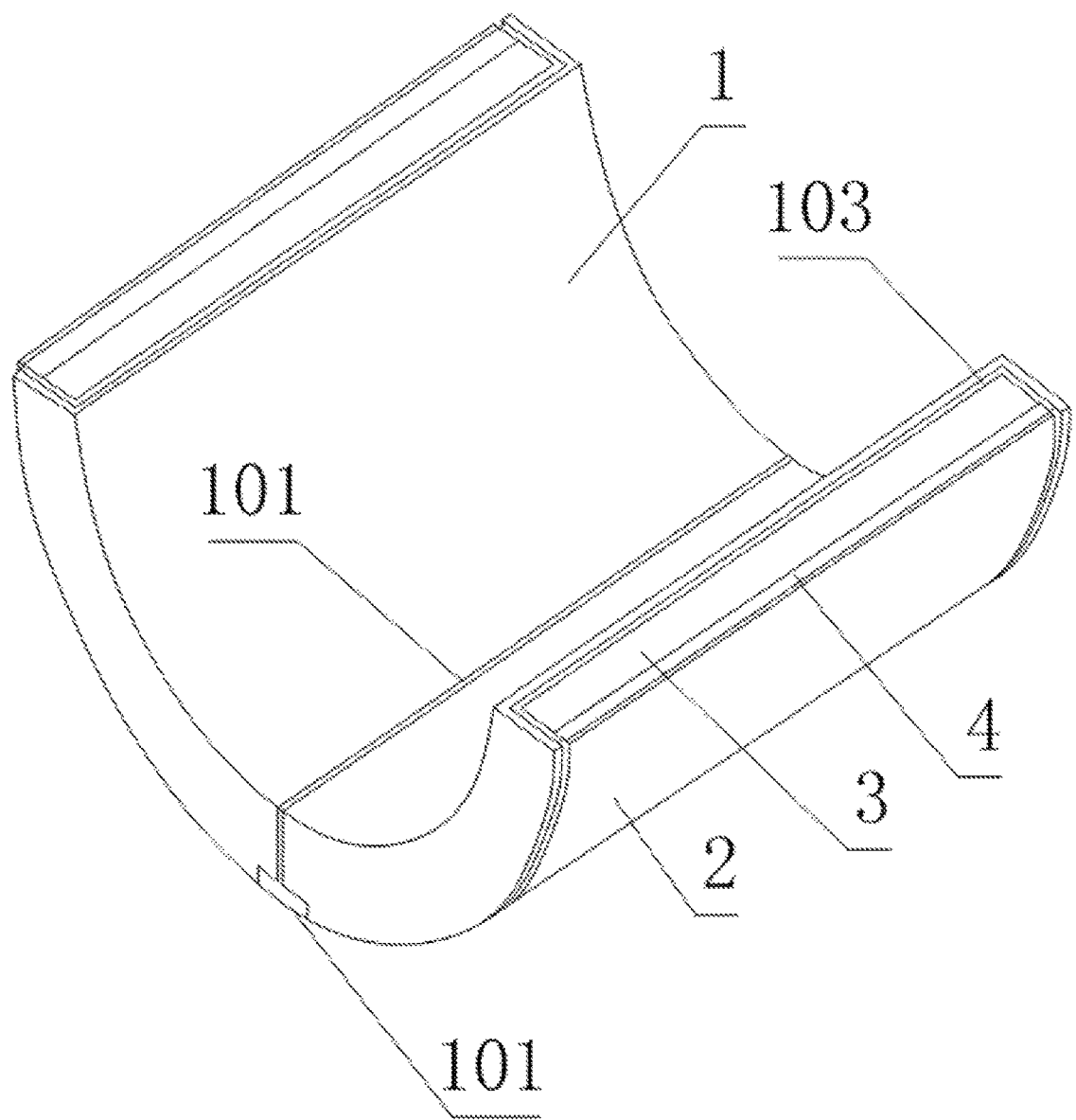
FIG. 1 is a structural cutaway view of a specific Example of an electromagnetic coil bobbin used in reactor described in the invention.

Numbers in the drawings respectively represent: 1. inner bobbin, 2. outer shell, 3. coil winding, 4. potted insulating layer, 101. cut-off groove, 102. insulating strip, 103. insulating layer, and 201. insulating clamping strip.

DETAILED DESCRIPTION OF THE PREFERRED EMBODIMENT

The invention will be further illustrated in detail in conjunction with Examples, but the structure of the invention is not limited to the following Example.

Example 1

Figure 2:
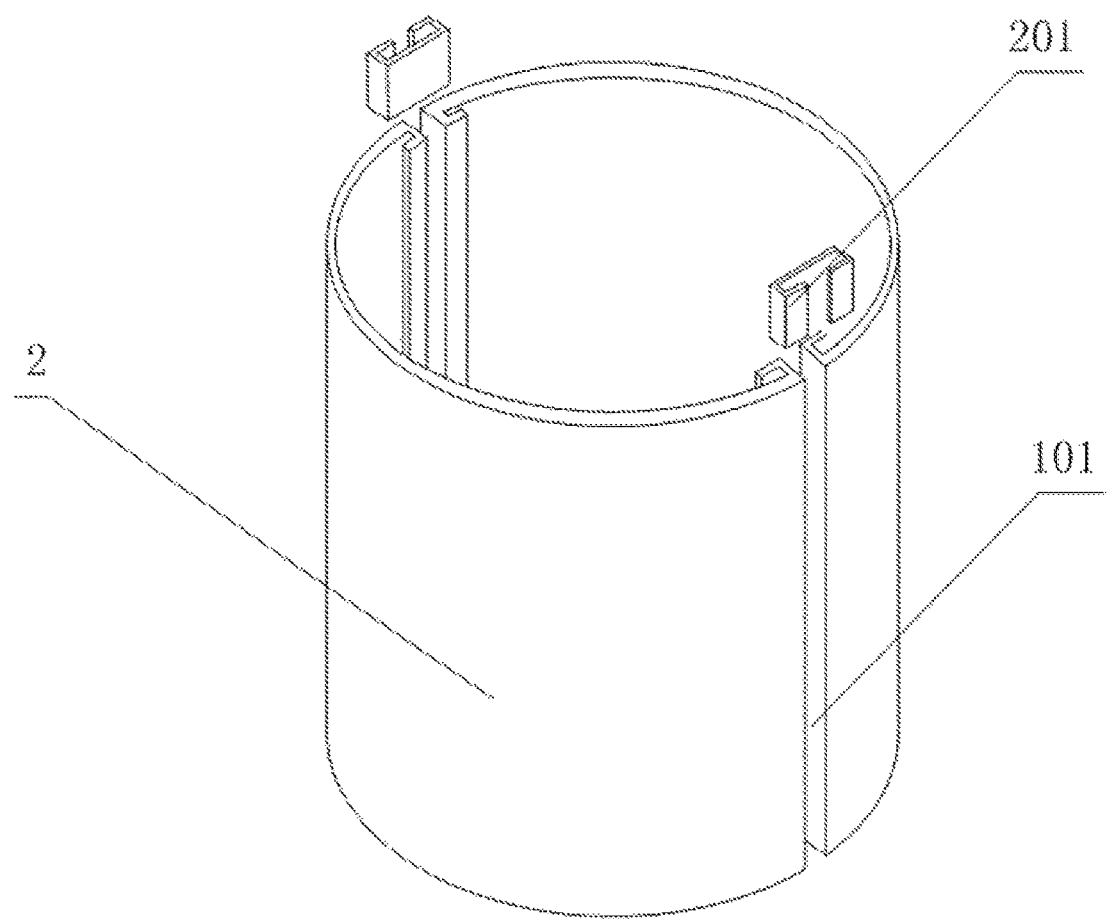
FIG. 2 is a structural schematic diagram of an outer shell in a specific Example of an electromagnetic coil bobbin used in reactor described in the invention.
Figure 3:
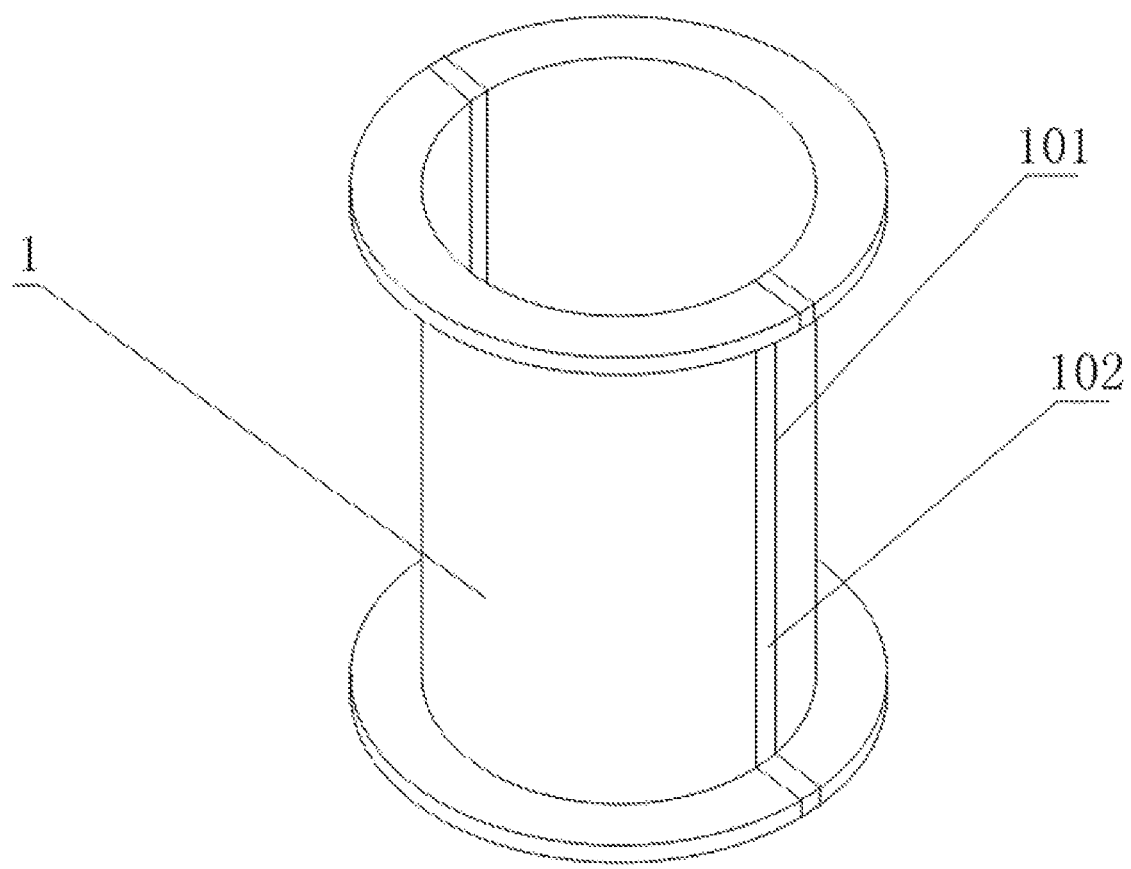
FIG. 3 is a structural schematic diagram of an inner bobbin in a specific Example of an electromagnetic coil bobbin used in reactor described in the invention.

As shown in FIG. 1 through FIG. 3, an electromagnetic coil bobbin used in reactor, comprises an inner bobbin 1 and an outer shell 2 which form a cylindrical structure, an annular cavity for containing a coil winding 3 is formed between said outer shell 2 and said inner bobbin 1, and the inner bobbin 1 is located in an inner hole of the outer shell 2;

said inner bobbin 1 and said outer shell 2 each comprise a main body of which the material is metal and cut-off grooves 101 provided on the main body, the cut-off grooves 101 on the inner bobbin 1 run through inner and outer walls as well as front and rear end faces of the inner bobbin 1, and the cut-off grooves 101 on the outer shell 2 run through inner and outer walls as well as front and rear end faces of the outer shell 2, there are at least two cut-off grooves 101 on both the inner bobbin 1 and the outer shell 2, the cut-off grooves 101 on the inner bobbin 1 are uniformly distributed on the inner bobbin 1, the cut-off grooves 101 on the outer shell 2 are uniformly distributed on the outer shell 2, and said cut-off grooves 101 are each provided with an insulating connection strip therein.

In this scheme, the metallic main body and the cut-off grooves 101 provided on the main body of the inner bobbin 1 and the outer shell 2 constitute the cylindrical structure of the inner bobbin and the outer shell, a gap between the inner bobbin 1 and the outer shell 2 is used to install the coil winding 3, and when the coil winding 3 operates, the cut-off grooves 101 on the inner bobbin 1 and the outer shell 2 are used to cut off the inner bobbin 1 and the outer shell 2 on the inner bobbin 1 and the outer shell 2 so as to avoid generation of induced eddy current. Namely the technical scheme in which the cut-off grooves 101 on the inner bobbin 1 and the outer shell 2 run through inner and outer walls as well as front and rear end faces of the inner bobbin 1 or the outer shell 2, and there are at least two cut-off grooves 101 on both the inner bobbin 1 and the outer shell 2 aims to realize that: if there are a plurality of cut-off grooves on the inner bobbin 1 and the outer shell 2 respectively, the main bodies of the inner bobbin 1 and the outer shell 2 are cut into the plurality of arc-shaped metal plates, and the arc-shaped metal plates are connected through the insulating connection strips such that the inner bobbin 1 and the outer shell 2 are a cylindrical structure as a whole, and in this way the structures of above inner bobbin 1 and outer shell 2 can facilitate respective shape preservation without forming induced eddy current loop.

The electromagnetic coil in CRDM of the existing nuclear power station has a bobbin which is an enclosed annular ring injection-compression molded with high molecular non-metallic material. But due to poor high temperature resistance of the high molecular material, generally the temperature resistance grade of the whole coil can only reach around 250° C. In order to overcome this weakness, there has been a high temperature coil scheme employing metal bobbin, but providing only one cut-off groove 101 thereon has some negative effects on CRDM; the magnetic field produced by the coil made by winding on such bobbin has certain asymmetry, resulting in that the magnetic field easily produces asymmetric electromagnetic component forces, such that internal moving parts of the CRDM tend to rotate in the radial direction while moving in the axial direction, which increasing resistance force toward an anti-rotation stopper, and after movement for a long time, eccentric wear, partial excessive wear and other phenomena easily appear, thus making movement performance of CRDM become worse.

In this scheme, employing the technical scheme in which there are at least two cut-off grooves 101 on both the inner bobbin 2 and the outer shell 2, and the cut-off grooves 101 on both the inner bobbin 1 and the outer shell 2 are uniformly distributed on the inner bobbin 1 or the outer shell 2 can make the magnetic field produced when the electromagnetic coil operates become completely uniform after going through the inner bobbin 1 or the outer shell 2, and achieve the objectives of weakening or eliminating rotation trend produced when the internal moving parts of the CRDM moves in the axial direction, thus achieving the technical effects of reducing or avoiding eccentric wear, reducing or avoiding partial excessive wear, etc., and realizing the objectives of improving movement performance of CRDM.

The invention also provides an inner bobbin of the electromagnetic coil bobbin, said inner bobbin comprises a main body of which the material is metal and cut-off grooves 101 provided on the main body, the length direction of said cut-off grooves 101 is parallel to the axial direction of the inner bobbin 1, the cut-off grooves 101 on the inner bobbin 1 run through inner and outer walls as well as front and rear end faces of the inner bobbin 1, and there are at least two cut-off grooves 101 on the inner bobbin 1, the cut-off grooves 101 on the inner bobbin 2 are uniformly distributed on the inner bobbin 1, and said cut-off grooves 101 are each provided with an insulating connection strip therein.

The invention also provides an outer shell of the electromagnetic coil bobbin, said outer shell 2 comprises a main body of which the material is metal and cut-off grooves 101 provided on the main body, the length direction of said cut-off grooves 101 is parallel to the axial direction of the outer shell 2, the cut-off grooves 101 on the outer shell 2 run through inner and outer walls as well as front and rear end faces of the outer shell 2, and there are at least two cut-off grooves 101 on the outer shell 2, the cut-off grooves 101 on the outer shell 2 are uniformly distributed on the outer shell 2, and said cut-off grooves 101 are each provided with an insulating connection strip therein. The technical scheme of the inner bobbin 1 and the outer shell 2 provided above can make the magnetic field through the inner bobbin 1 or the outer shell 2 completely symmetric relative to the axis of the electromagnetic coil when the coil winding 3 operates, avoid eccentric wear and partial excessive wear between internal moving parts of the CRDM, achieve the objectives of protecting internal moving parts of the CRDM, and meanwhile is beneficial to improve movement performance of CRDM.

Above the cut-off grooves 101 on the inner bobbin 1 and the outer shell 2 are uniformly distributed on the inner bobbin 1 or the outer shell 2, which means that the cut-off grooves 101 on the inner bobbin 1 are uniformly distributed in an annular shape relative to the axis of the inner bobbin 1, the cut-off grooves 101 on the outer shell 2 are uniformly distributed in an annular shape relative to the axis of the outer shell 2, and above insulating connection strips can employ insulating material made from ceramic, mica, etc.

Example 2

As shown in FIG. 1 through FIG. 3, this Example makes a further limitation on the basis of Example 1: because the inner bobbin 1 is used as a fixed substrate of the electromagnetic coil winding 3, both its installation and use only require an integral structure in a cylindrical shape, and as a specific technical scheme of the inner bobbin 1 convenient to manufacture the inner bobbin 1, the insulating connection strips on said inner bobbin 1 are insulating strips 102 potted or embedded in the cut-off grooves 101 on the inner bobbin 1.

Example 3

As shown in FIG. 1 through FIG. 3, this Example makes a further limitation on the basis of Example 1: as the specific connection form between the inner bobbin 1 and the outer shell 2, both ends of said inner bobbin 1 are provided with annular outer edges, the axis of said outer edges and the axis of the main body are collinear, and the inner hole of the outer edge is connected to the end of the inner bobbin 1; the cut-off grooves 101 on the inner bobbin 1 extend to the end of the outer edge, the external diameter of said outer shell 2 is not greater than the external diameter of the outer edge, the outer shell 2 is clamped between two outer edges, and an insulating layer 103 is provided between each outer edge and the end of corresponding outer shell 2. In above connection form, relative positions of the inner bobbin 1 and the outer shell 2 can be easily fixed, which is beneficial for the electromagnetic coil to keep excellent operating performance for a lone time. In order to protect the electromagnetic coil winding 3 as much as possible, said annular cavity is an enclosed structure.

Example 4

As shown in FIG. 1 through FIG. 3, this Example makes a further limitation on the basis of Example 1: because the outer shell 2 is used as a protective component of the electromagnetic coil winding 3, it should be equipped outside the electromagnetic coil winding 3 after installing the coil winding 3, and as a technical scheme of the outer shell 2 convenient to install the outer shell 2, a clamping slot or clamping projection is provided on the portions of the outer shell 2 on both sides of each cut-off groove 101 on said outer shell 2, the length direction of said clamping slot or clamping projection is parallel to the axial direction of the outer shell 2, the clamping slot or clamping projection is originated from one end of the outer shell 2, and the insulating connection strips on said outer shell 2 are insulating clamping strips 201 connected to the clamping slot or clamping projection on the portions of the outer shell 2 on both sides of the same cut-off groove 101 on the outer shell 2. In the above structure, through restriction of the insulating clamping strips 201 toward corresponding clamping slot or clamping projection, combination of various parts of the outer shell 2 is completed, while after removing above restriction, various parts of the outer shell 2 are separated from each other.

Example 5

As shown in FIG. 1 through FIG. 3, this Example makes a further limitation on the basis of Example 1: in order to completely eliminate asymmetric electromagnetic component forces produced in the radial direction when the coil winding 3 operates, the number of the cut-off grooves 101 on said inner bobbin 1 and the number of the cut-off grooves 101 on the outer shell 2 are in a multiple relationship, and the value of said multiple is a positive integer. By limiting the numbers of the cut-off grooves 101 on the inner bobbin 1 and the outer shell 2 above, asymmetric electromagnetic component forces cancel each other out in respective radial directions of the electromagnetic coil winding 3, which can completely eliminate occurrence of the conditions such as eccentric wear, partial excessive wear and stress produced on the anti-rotation stopper due to asymmetric magnetic field produced by the electromagnetic coil.

Example 6

This Example makes a further limitation on the basis of Example 1: as the technical scheme in which the electromagnetic coil produces completely uniform magnetic field, the number of the cut-off grooves 101 on said inner bobbin 1 is equal to the number of the cut-off grooves 101 on the outer shell 2, positions of the cut-off grooves 101 on the inner bobbin 1 and the outer shell 2 have one-to-one correspondence, and said one-to-one correspondence is that the cut-off grooves 101 on the inner bobbin 1 and the cut-off grooves 101 on the outer shell 2 are located in the same radial direction of the electromagnetic coil bobbin structure.

Example 7

This Example provides a specific application scheme, as described in FIG. 1, the coil winding 3 is wound on the inner bobbin 1, and an insulating layer 103 of which the material is mica is provided between the coil winding 3 and the inner bobbin 1; the outer shell 2 is wrapped on the coil winding 3, and a potted insulating layer 4 is provided between the oil winding 3 and the outer shell 2; said potted insulating layer 4 is a cylindrical structure obtained by vacuum pouring insulating paint and quartz sand and by high temperature curing, and both inner bobbin 1 and the outer shell 2 are non-conductive magnetic stainless steel.

Example 8

This Example makes a further limitation on the basis of any technical scheme provided in any Example above: as shown in FIG. 1 through FIG. 3, in order to facilitate processing and manufacturing, the length direction of the cut-off grooves 101 on said inner bobbin 1 and outer shell 2 is parallel to the axial direction of the inner bobbin 1 or the outer shell 2. The above structure can employ a metal cylinder with different internal diameters as the blank of the inner bobbin 1 and the outer shell 2, and is evenly divided into several equal parts through accurate cutting in the axial direction and filled with the insulating connection strips in the portion worn off during cutting to obtain the inner bobbin and the outer shell required in this scheme.

The foregoing is further detailed illustration of the invention made in conjunction with specific preferred embodiments, and it could not affirm that specific embodiments of the invention is only limited to these description. For those ordinary persons skilled in the art that the invention belongs to, other embodiments obtained without departing from the technical schemes of the invention, shall fall within the claimed scope of the invention.

The invention claimed is:

1. An electromagnetic coil bobbin used in reactor, comprising an inner bobbin and an outer shell which form a cylindrical structure, wherein an annular cavity for containing a coil winding is formed by said outer shell and said inner bobbin, and the inner bobbin is located in an inner hole of the outer shell;

said inner bobbin and said outer shell each comprise a main body of which the material is metal and cut-off grooves provided on the main body, the cut-off grooves on the inner bobbin run through inner and outer walls as well as front and rear end faces of the inner bobbin, and the cut-off grooves on the outer shell run through inner and outer walls as well as front and rear end faces of the outer shell, wherein, there are at least two cut-off grooves on both the inner bobbin and the outer shell, the cut-off grooves on the inner bobbin are uniformly distributed on the inner bobbin, the cut-off grooves on the outer shell are uniformly distributed on the outer shell, and said cut-off grooves are each provided with an insulating connection strip therein, and wherein:

a clamping slot or clamping projection is provided on the portions of the outer shell on both sides of each cut-off groove on said outer shell, the length direction of said clamping slot or clamping projection is parallel to the axial direction of the outer shell, the clamping slot or clamping projection is originated from one end of the outer shell, and the insulating connection strips on said outer shell are insulating clamping strips connected to the clamping slot or clamping projection on the portions of the outer shell on both sides of the same cut-off groove on the outer shell, and/or both ends of said inner bobbin are provided with annular outer edges, the axis of said outer edges and the axis of the main body are collinear, and the inner hole of the outer edge is connected to the end of the inner bobbin; the cut-off grooves on the inner bobbin extend to the end of the outer edge, the external diameter of said outer shell is not greater than the external diameter of the outer edge, the outer shell is clamped between two outer edges, and an insulating layer is provided between each outer edge and the end of corresponding outer shell.

2. The electromagnetic coil bobbin used in reactor according to claim 1, wherein, the insulating connection strips on said inner bobbin are insulating strips potted or embedded in the cut-off grooves on the inner bobbin.

3. The electromagnetic coil bobbin used in reactor according to claim 2, wherein, the length direction of the cut-off grooves on said inner bobbin and outer shell is parallel to the axial direction of the inner bobbin or the outer shell.

4. The electromagnetic coil bobbin used in reactor according to claim 1, wherein, a number of the cut-off grooves on said inner bobbin is a positive integer multiple of a number of the cut-off grooves on the outer shell or the number of cut-off grooves on the outer shell is a positive integer multiple of the number of cut-off grooves on the inner bobbin.

5. The electromagnetic coil bobbin used in reactor according to claim 4, wherein, the length direction of the cut-off grooves on said inner bobbin and outer shell is parallel to the axial direction of the inner bobbin or the outer shell.

6. The electromagnetic coil bobbin used in reactor according to claim 1, wherein, the number of the cut-off grooves on said inner bobbin is equal to the number of the cut-off grooves on the outer shell, positions of the cut-off grooves on the inner bobbin and the outer shell have one-to-one correspondence, and said one-to-one correspondence is that the cut-off grooves on the inner bobbin and the cut-off grooves on the outer shell are located in the same radial direction of the electromagnetic coil bobbin structure.

7. The electromagnetic coil bobbin used in reactor according to claim 6, wherein, the length direction of the cut-off grooves on said inner bobbin and outer shell is parallel to the axial direction of the inner bobbin or the outer shell.

8. The electromagnetic coil bobbin used in reactor according to claim 1, wherein, said annular cavity is an enclosed structure.

9. The electromagnetic coil bobbin used in reactor according to claim 8, wherein, the length direction of the cut-off grooves on said inner bobbin and outer shell is parallel to the axial direction of the inner bobbin or the outer shell.

10. The electromagnetic coil bobbin used in reactor according to claim 1, wherein, the length direction of the cut-off grooves on said inner bobbin and outer shell is parallel to the axial direction of the inner bobbin or the outer shell.

11. The electromagnetic coil bobbin used in reactor according to claim 1, wherein, the length direction of the cut-off grooves on said inner bobbin and outer shell is parallel to the axial direction of the inner bobbin or the outer shell.

12. The electromagnetic coil bobbin used in reactor according to claim 1, wherein, the length direction of the cut-off grooves on said inner bobbin and outer shell is parallel to the axial direction of the inner bobbin or the outer shell.

13. An inner bobbin of the electromagnetic coil bobbin, wherein, said inner bobbin comprises a main body of which the material is metal and cut-off grooves provided on the main body, the length direction of said cut-off grooves is parallel to the axial direction of the inner bobbin, the cut-off grooves on the inner bobbin run through inner and outer walls as well as front and rear end faces of the inner bobbin, and there are at least two cut-off grooves on the inner bobbin, the cut-off grooves on the inner bobbin are uniformly distributed on the inner bobbin, and said cut-off grooves are each provided with an insulating connection strip therein, wherein, both ends of said inner bobbin are provided with annular outer edges, the axis of said outer edges and the axis of the main body are collinear, and the inner hole of the outer edge is connected to the end of the inner bobbin; the cut-off grooves on the inner bobbin extend to the end of the outer edge, the external diameter of said outer shell is not greater than the external diameter of the outer edge, the outer shell is clamped between two outer edges, and an insulating layer is provided between each outer edge and the end of corresponding outer shell.

14. An outer shell of the electromagnetic coil bobbin, wherein, said outer shell comprises a main body of which the material is metal and cut-off grooves provided on the main body, the length direction of said cut-off grooves is parallel to the axial direction of the outer shell, the cut-off grooves on the outer shell run through inner and outer walls as well as front and rear end faces of the outer shell, and there are at least two cut-off grooves on the outer shell, the cut-off grooves on the outer shell are uniformly distributed on the outer shell, and said cut-off grooves are each provided with an insulating connection strip therein, wherein, a clamping slot or clamping projection is provided on the portions of the outer shell on both sides of each cut-off groove on said outer shell, the length direction of said clamping slot or clamping projection is parallel to the axial direction of the outer shell, the clamping slot or clamping projection is originated from one end of the outer shell, and the insulating connection strips on said outer shell are insulating clamping strips connected to the clamping slot or clamping projection on the portions of the outer shell on both sides of the same cut-off groove on the outer shell.

\* \* \* \* \*